United States Patent [19]
Keappler

[11] 3,787,292
[45] Jan. 22, 1974

[54] APPARATUS FOR PYROLYSIS OF WASTES

[76] Inventor: Ernest W. Keappler, 1015 Pegg Rd., East Point, Ga. 30344

[22] Filed: Aug. 13, 1971

[21] Appl. No.: 171,480

[52] U.S. Cl.............. 202/118, 202/131, 202/136, 202/138, 48/111, 432/107
[51] Int. Cl............................................. C10b 1/10
[58] Field of Search... 202/100, 131, 132, 136, 137, 202/138, 216, 218, 220, 225, 108, 124, 118; 201/33, 25, 44; 263/32, 33, 35; 48/111, 209; 432/107

[56] References Cited
UNITED STATES PATENTS

| 1,534,737 | 4/1925 | Reed | 202/118 |
|---|---|---|---|
| 353,966 | 12/1886 | Rathbun | 202/118 |
| 1,407,372 | 2/1922 | Bradley | 263/32 |
| 2,664,389 | 12/1953 | Rex et al | 202/100 X |
| 3,162,431 | 12/1964 | Muller | 263/44 |
| 160,649 | 3/1875 | Clark | 202/118 X |

FOREIGN PATENTS OR APPLICATIONS

| 206,105 | 9/1924 | Great Britain | 202/132 |
|---|---|---|---|

Primary Examiner—Norman Yudkoff
Assistant Examiner—David Edwards
Attorney, Agent, or Firm—Newton, Hopkins & Ormsby

[57] ABSTRACT

Method and apparatus for the pyrolysis of solid wastes including a retort defining a plurality of interior temperature zones, a heating means disposed through said retort, a means for rotating said retort about said heating means, a waste infeed, a residue outlet, and at least one fluid exhaust means communicating with the interior of said retort.

9 Claims, 7 Drawing Figures

INVENTOR.
ERNEST W. KEAPPLER

APPARATUS FOR PYROLYSIS OF WASTES

BACKGROUND OF THE INVENTION

This invention relates to the treatment of waste and more particularly to a method and apparatus for the pyrolysis of solid and liquid organic waste.

The disposal of waste from municipalities and industries is becoming an economical and ecological challenge of growing proportions. The quantity of refuse which comprises waste paper, textiles, garbage, metal and glass is over two hundred million tons a year in the United States alone, and is increasing faster than the population.

Present methods of waste disposal are fast becoming inadequate. The common open garbage dump is being outlawed in many areas. Sanitary landfilling requires acreages which are usually not available near large urban centers. Composting reduces the organic matter only partially and is otherwise seldom economical. Incineration is a growing method of refuse disposal but is an expensive process.

A method of handling waste which is gaining acceptance is that of decomposition of the waste by pyrolysis. The term "pyrolysis" means the chemical decomposition of a material by the action of heat in the absence of oxygen. Since the pyrolysis method is performed in an essentially oxygen-free atmosphere, the waste cannot burn. Hence, the wastes decompose or pyrolyze into products which include steam, combustible gases, lignumous tars and liquids, and char.

There are two major reasons why waste conversion by pyrolysis is attracting attention and gaining acceptance. First, it makes refuse disposal a profit making proposition, or at the least, it should be possible to break even. This is primarily true because the pyrolytic end products have economical value. Also, the raw material is available at a negative cost and is available in large quantities at urban centers where markets for products and energy also exist. Second, air-borne pollutants can be kept at very low levels.

Previous methods and apparatus for the conversion of waste by pyrolysis have proved to be inadequate. The patent to Lantz, U. S. Pat. No. 3,020,212, discloses a refuse converter employing three interconnected pipes vertically disposed within a combustion chamber in parallel relationship, each having a screw-type refuse conveyor therethrough which advances the refuse counter-current to the flow of the waste through the previous pipe. Each of the pipes has a progressively smaller diameter in descending relation. A burner means is positioned under the bottom-most pipe to heat the three pipes, and the chamber is provided with insulation to trap the heat interiorily. Additionally, after traveling through the three pipes, the refuse passes through a cooling unit which is exterior of the chamber.

There are numerous disadvantages with the operation and maintenance of the Lantz converter. First, there is not an efficient conversion of the waste into the by-products because the heating element is located at the bottom of the chamber, therefore not providing a uniform heating or pyrolysis of the material. There is an inefficient heat transfer from the burner means to the waste material because all of the heat does not go into the material directly. Also, the chamber utilizes a heavy, expensive insulating jacket that requires periodic maintenance and replacement. The system employs three pipes with three conveyor systems, all of which add to the complexity of the apparatus. There is no utilization of the heat radiating from the converted or pyrolyzed material to heat the incoming waste material, but rather the pyrolyzed material passes through a cooling unit which requires further machinery. The venting of the gases evolved from the pyrolysis of the waste is not adequate, because there is no attempt to segregate the steam from the other emitted volatile gases such as hydrogen and methane. These fluids are separated in a vapor separator, further adding to the complexity of the apparatus and the method. All of these auxilliary equipment add to the cost of the apparatus. A further drawback with the Lantz converter is that the conveyors can become clogged due to large masses or clumps of material which cannot pass through the conveyor system. The apparatus then has to be shut down and these conveyors cleaned, adding to the maintenance problem.

SUMMARY OF THE INVENTION

The disadvantages of the prior art are overcome by this invention which provides for a method and apparatus for the pyrolysis of solid waste including a retort having first and second ends and comprising a pair of concentric cylinders, the cylinders defining an inner and outer chamber respectively; a waste inlet means adjacent the first end of the retort communicating with the outer chamber; and outlet means for the pyrolized residue adjacent the second end of the retort including an opening communicating with the outer chamber and a residue collection chamber in flow communication with the opening; a blower means having an exhaust conduit means communicating with the interior of the collection chamber for aiding in cooling the residue introduced into the chamber; heating means adjacent the second end of the retort including a mixing chamber in flow communication with the exhaust conduit means and having an open end for directing a stream of air into the inner chamber, a dispensing nozzle supported in the mixing chamber for dispensing combustible gas means into the inner chamber and connected to a combustible gas supply means, and a selectively settable air regulator means; support means within the outer chamber for supporting the first cylinder within the second cylinder and defining a series of temperature zones through the outer chamber; a steam exhaust means and a pyrolytic gas exhaust means communicating with the outer chamber; and a means for rotating the retort about its inner chamber.

It is, therefore, a primary object of this invention to provide an apparatus for the conversion of waste material employing a pyrolysis retort which rotates about a heating means for uniform, efficient heat transfer to the waste.

Another object of the present invention is to provide a method for the pyrolysis of solid waste employing the step of advancing the waste through a retort counter-current to the flow of heat through a heating means about which the retort is rotating.

Another object of this invention is to provide an apparatus for the pyrolysis of waste material which eliminates the need for heat insulating means.

An object of this invention is to provide a retort for the pyrolysis of waste material employing a support means for supporting an inner cylinder within the retort which also acts as a means for advancing the waste through the retort.

Another object of this invention is to provide an apparatus for the pyrolysis of solid waste wherein a plurality of different temperature zones are defined through the apparatus.

A still further object of the present invention is to provide an apparatus for the pyrolysis of solid waste employing a blower means which is operably associated with the outlet for the pyrolized residue to aid in cooling the residue and which also is operably associated with the heating means for the apparatus to provide blown hot air.

Another object of this invention is to provide an apparatus for the pyrolysis of solid waste which employs fewer pieces of auxiliary equipment for its operations than previous waste pyrolysis sytems.

An additional object of the present invention is to provide an apparatus for the pyrolysis of solid waste wherein the volatile fluids emitted from the heated waste material are successively exhausted from the apparatus.

Another object of this invention is to provide an apparatus for the pyrolysis of solid waste wherein the pyrolytic gases emitted from the heated waste material are utilized to fuel the heating means for the apparatus.

Another object of this invention is to provide an apparatus for the pyrolysis of solid waste which is ecologically safe in keeping at very low levels the airborne pollutants and hot air emitted from the apparatus.

An additional object of the present invention is to provide an apparatus for the pyrolysis of solid waste which is simple and sturdy in construction, economical to manufacture and to operate, easy to maintain, and reliable in operation.

Still other objects and advantages of the present invention will become apparent after reading the accompanying description of the selected illustrative embodiment of the invention with reference to the attached drawings wherein like reference characters have been used to refer to the like parts throughout the figures of drawings, and wherein:

BRIEF DESCRIPTION OF THE FIGURES OF DRAWINGS

DESCRIPTION OF THE INVENTION

Figure 1:
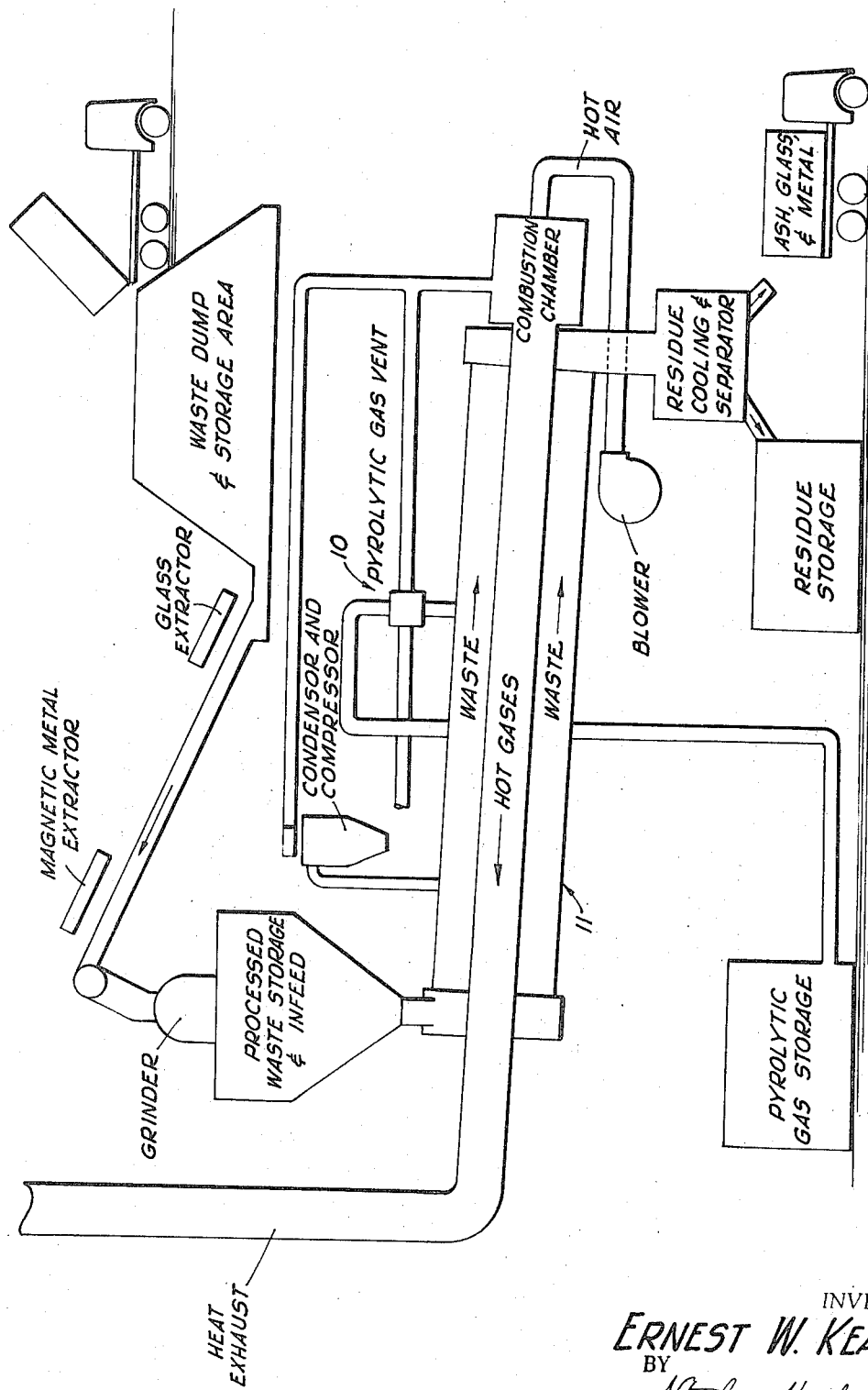
FIG. 1 is a schematic of a waste conversion system employing the pyrolysis apparatus of the present invention.
Figure 2:
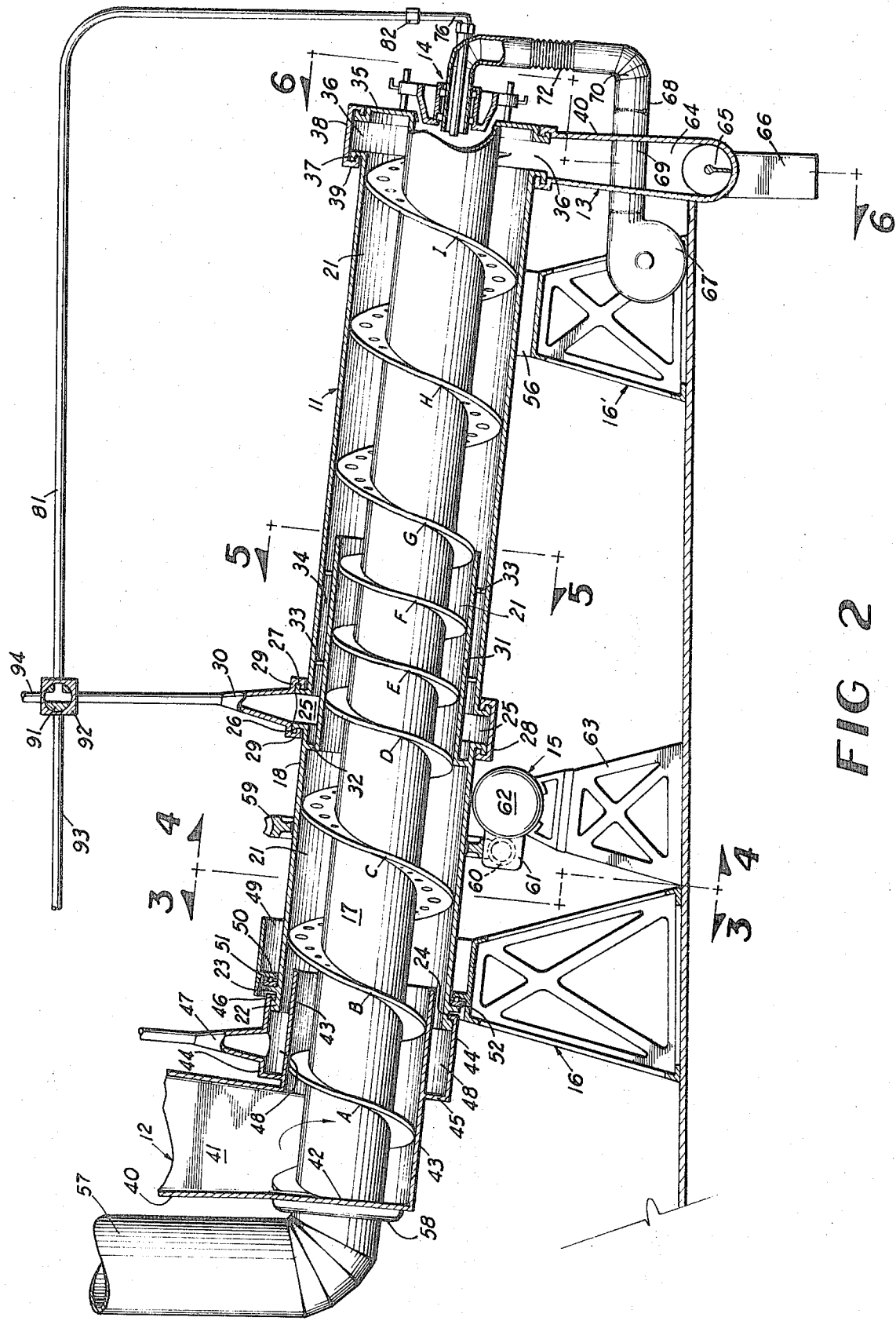
FIG. 2 is a partial sectional view taken substantially longitudinally of the pyrolysis apparatus with parts broken away for clarity.

Referring now in detail to the embodiment chosen for the purpose of illustrating the present invention, numeral 10 denotes generally the apparatus for the pyrolysis of solid waste as seen in FIGS. 1 and 2.

The apparatus 20 includes a retort 11, a waste infeed means 12, a pyrolytic residue outlet means 13, a heating or combustion means 14, a rotating means 15, and a retort support means 16 and 16'. The retort 11 has a forward or first end adjacent the waste infeed means 12 and a rear or second end adjacent the residue outlet means 13 and includes a pair of concentric cylinders 17 and 18. Inner cylinder 17 has an axially extending opening through the rear end of the retort 11 and defines an inner chamber 19. Projecting into chamber 19 are a plurality of heat exchange baffles 20 which are spaced along the length of the interior wall of cylinder 17 in random fashion. As hereinafter described, the interior wall of cylinder 17 is a removable lining to which the baffles 20 are attached.

Outer cylinder 18 defines an outer chamber 21. The end of cylinder 18 communicating with the waste infeed means 12 terminates in an annular ring 22. Adjacent ring 22 is annular ring 23. Rings 22 and 23 define therebetween a rotating groove 24. Located towards the middle of the cylinder 18 is an annular opening 25 communicating with chamber 21 and formed by opposite faced annular flanges 26 and 27.

A stationary annular ring portion 28 is in rotating engagement with flanges 26 and 27 by means of opposed annular flange members 29. The flanges 26 and 27 rotate within flange 29 by any suitable lubricating means, such as bearings. Disposed on the top of ring 28 and communicating therethrough with opening 25 is the pyrolytic gas exhaust means which is a radially extending cylinder 30.

Figure 5:
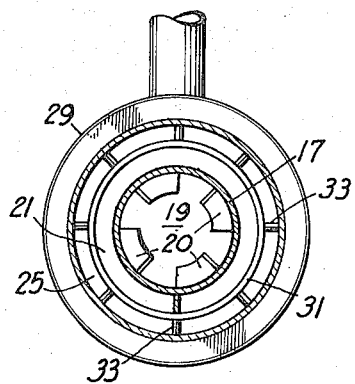
FIG. 5 is a section view of the apparatus taken along line 5—5 of FIG. 2.

A cylinder portion 31 is located under opening 25 within chamber 21 and is secured around the interior wall of cylinder 18 by annular rib 32 which is located forward of hole 25. Cylinder 31 is further supported away from the interior wall of cylinder 18 by two series of ribs 33 spaced around the exterior cylinder portion 31, as seen in FIG. 5. The diameter of cylinder portion 31 is less than the diameter of cylinder 18, thus forming a pyrolytic gas chamber 33 between the two cylinders.

Figure 7:
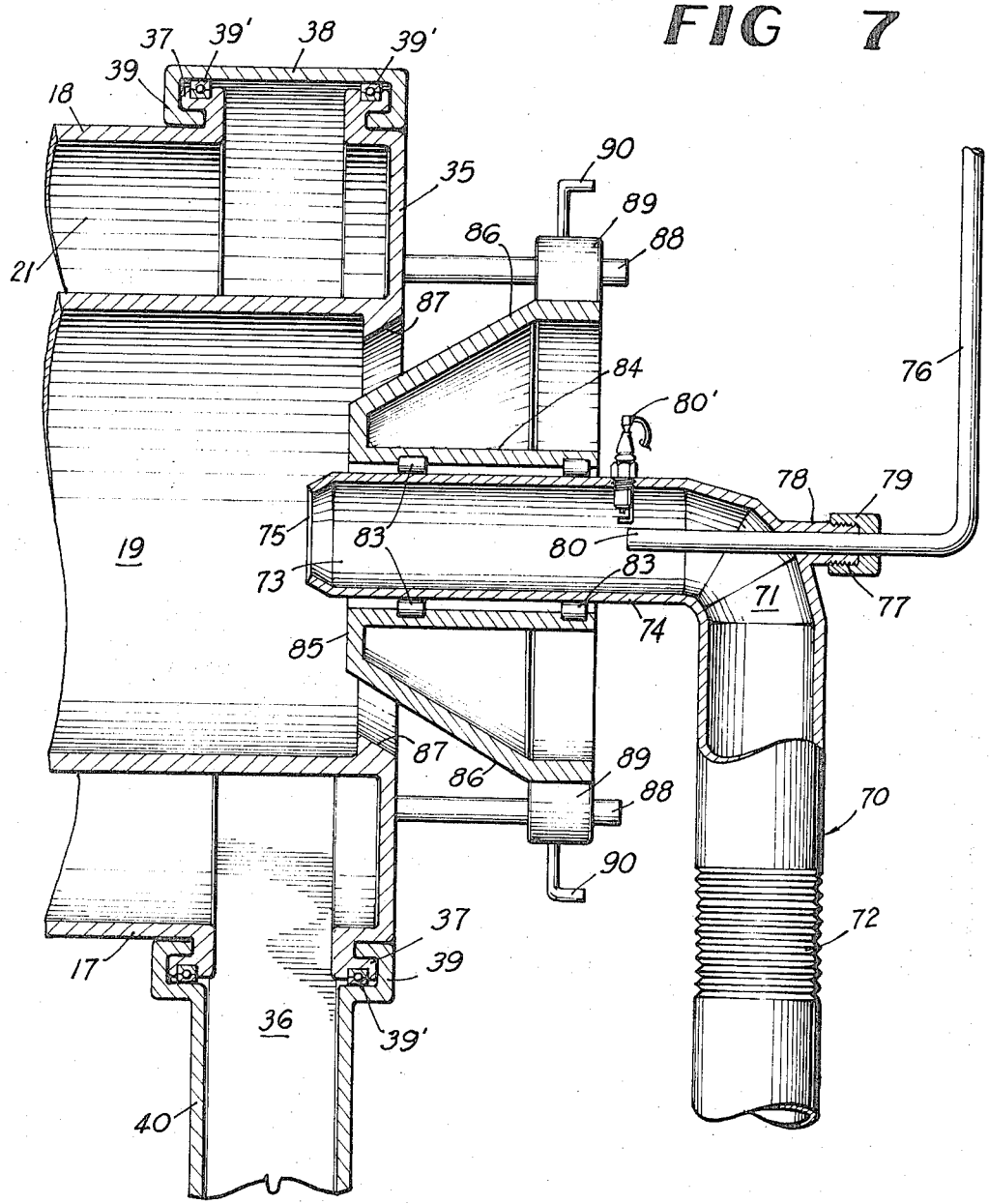
FIG. 7 is a fragmentary longitudinal cross-sectional view of the rear end of the apparatus.

Adjacent the rear wall 35 of cylinder 18 is an annular pyrolytic residue opening 36 communicating with chamber 21 and formed by opposite faced annular flanges 37. A stationary annular ring portion 38 is in rotating engagement with flanges 37 by means of opposed annular flanges 39. The flanges 37 rotate within flanges 39 by any suitable lubricating means, such as bearing rings 39', as seen in FIG. 7. Depending from ring 38 and communicating therethrough with opening 36 is residue collection bin 40. Bin 40 will be described in detail hereinafter.

The inner cylinder 17 axially extends beyond cylinder 18 into the stationary waste infeed means 12. Infeed means 12 comprises a converging annular wall portion 40 located forward of the retort 11 and defining a hopper area 41. The forward portion of wall 40 terminates in forward wall 42 of the apparatus 10. The rear portion of wall 40 terminates in a stationary tubular portion 43 which is of a slightly smaller diameter than cylinder 18 and which axially projects into chamber 21. The length of tubular portion 43 is not less than 80% of its diameter. Tubular portion 43 also extends to the bottom edge of forward wall 42.

Stationary ring member 44 circumferentially extends around tubular portion 43 at its forward end and is supported away from portion 43 by annular ring 45 and is supported from cylinder 18 by annular flange 46 which is in rotating engagement by suitable means, such as bearings, with annular groove 24. Located on the top of ring 44 is the steam exhaust or vent means which is a radially extending cylinder 47 disposed through ring 44 and communicating with the annular steam chamber 48 formed between tubular portion 43 and ring 44.

Figure 3:
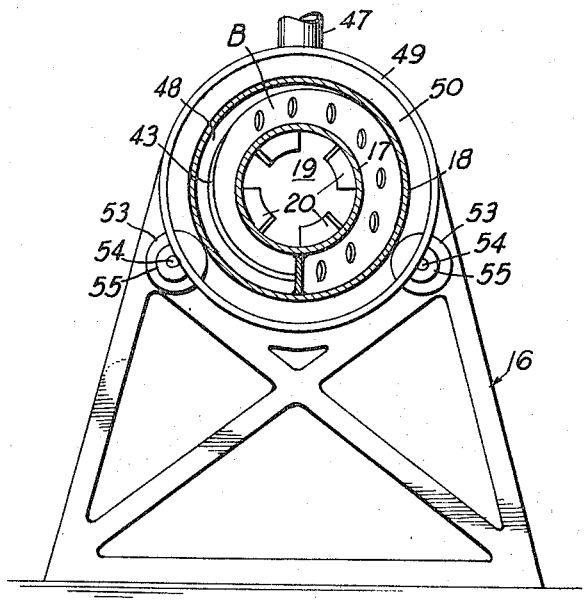
FIG. 3 is a section view of the apparatus taken along line 3—3 in FIG. 2.

Disposed on the top of the support means 16 is a collar 49 which circumferentially extends around cylinder 18. A thrust bearing assembly is located adjacent collar 49 and is composed of an annular ring 50 extending around the interior wall of collar 49, ball race 51, and collar portion 52 which abuts ring 23. As seen in FIG. 3, a pair of diametrically opposed rollers 53 are in rotary engagement with cylinder 18 through apertures (not shown) in collar 49. The rollers 53 rotate about rods 54 by means of journal housing 55.

Support means 16' also has disposed on its top surface a collar 56, but it is semi-circular in shape and therefore does not extend completely about cylinder 18. A pair of diametrically opposed rollers (not shown) are supported by collar 56 in rotating engagement with cylinder 18 in a similar arrangement as described above.

Extending through the forward wall 42 and communicating with the inner chamber 19 is a heat exhaust means, a stationary tubular shaped member 57 about which cylinder 17 rotates by means of the bearing collar 58. The member 57 is open to the atmosphere.

Figure 4:
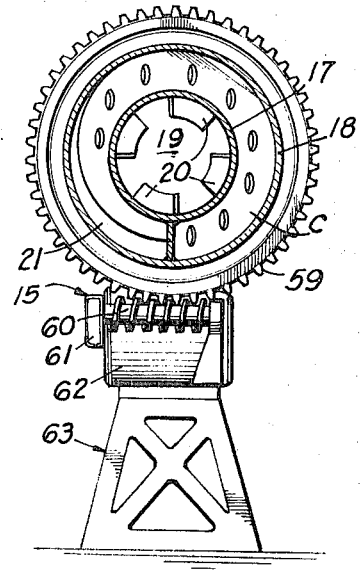
FIG. 4 is a section view of the apparatus taken along line 4—4 in FIG. 2.

As seen in FIGS. 2 and 4, the rotating means 15 includes a spur gear 59 which circumferentially extends about the exterior of cylinder 18 and is in rotating engagement with worm gear 60 which is connected to gear box 61. The rotating means is powered by conventional motor 62 which is mounted on the top of support brace 63 and which is connected to gear box 61.

Support means are intermediate inner cylinder 17 and outer cylinder 18 for supporting cylinder 17 within cylinder 18. The depicted embodiment of the support means as seen in FIG. 2 is a helical vane which, for description purposes, has its vane sections labeled A–I. Vane sections C–I are integrally formed along the exterior of cylinder 17 and secured to the interior of cylinder 18 and cylinder 31. The vanes A and B are formed along the exterior of cylinder 17 but are not secured around the outer edges, thus allowing free rotation of cylinder 17 within tubular portion 43. Vanes B and C and part of D are perforate, defining therebetween a steam generating zone within chamber 21. The remainder of vane D, vanes E and F and part of vane G are imperforate, defining therebetween a gas-tight zone. The remaining portion of vane G and vanes H and I are perforate, defining therebetween a pyrolytic gas generating zone.

Figure 6:
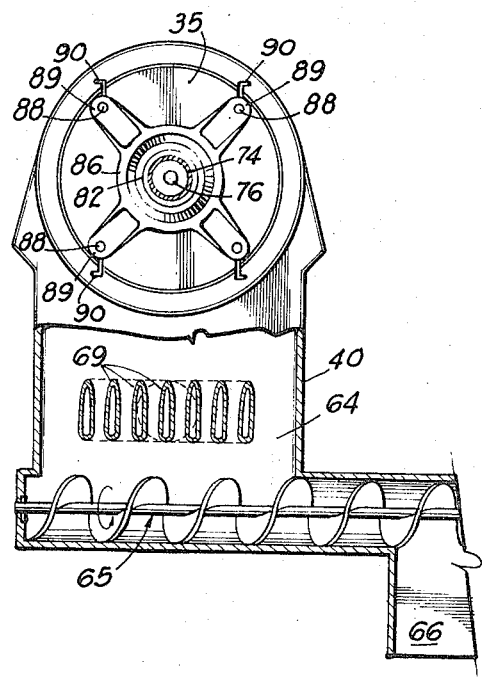
FIG. 6 is an end view of the apparatus taken along line 6—6 in FIG. 2.

The waste outlet means 13 includes bin 40 which depends beneath the outlet opening 36 for gravitional delivery of the pyrolized residue material or char into the discharge chamber 64 defined by bin 40. As seen in FIG. 6, a screw conveyor 65, which is powered by conventional means (not shown), is located at the bottom of bin 40 and communicates with a suitable waste storage area 66.

A blower means 67 is located exterior of the bin 40 and has an exhaust conduit means which includes a first conduit portion 68 which communicates with chamber 64 by means of a plurality of ports 69 spaced across the forward and rearward walls of bin 40. The air conduit portion 68 branches into a number of smaller conduits adjacent the exterior of the forward wall of bin 40, enters and exits bin 40 through ports 69, and re-combines into a single conduit portion adjacent the exterior of the rear wall of bin 40.

The first air conduit portion 68 terminates in an upwardly projecting second air conduit portion 70 which is in flow communication with first air conduit portion 68 and is operatively associated with the combustion means 14 by means of neck portion 71 for ejecting air pressure axially into inner chamber 19. Air conduit portion 70 is provided with a flexible accordion-like section 72 along a portion of its length.

Referring now to FIG. 7, the combustion means 14 comprises an axially extending mixing chamber 73 formed by tubular portion 74 and connected in flow communication with the neck portion 71. Mixing chamber 73 includes an open end 75 for exhausting the air pressure from blower 67 into chamber 19. A gas dispensing conduit portion 76 is inserted into mixing chamber 73 through neck portion 71 by means of a screw-clamp assembly comprising a hollow, threaded screw 77 projecting outward from hollow housing 78 which communicates with the mixing chamber 73, the screw 77 having a slit through a portion of its length which is closed by a complimentarily threaded bolt 79. Gas dispensing conduit 76 terminates within mixing chamber 73 in a gas dispensing nozzle 80. Disposed through the top of tubular portion 74 into the mixing chamber 73 forward of the opening to gas dispensing nozzle 80 is an gas ignition means, spark plug 80'. Gas dispensing conduit 76 is joined in flow communication with conduit 81 by means of a bolt 82 which threadedly engages conduit 76 and conduit 81.

Mixing chamber 73 is journaled, by means of a set of circumferentially spaced bearing rings 83, within a selectively settable air regulator means comprising a cylindrical portion 84 which has attached thereto by annular ring 85 an outer shell 86. Shell 86 has a sloping surface which is complimentary to the surface of the annular seal surface 87 secured around the interior wall of cylinder 17 adjacent end 35. Shell 86 and seal surface 87 define therebetween an adjustable air regulator entrance opening.

Circumferentially spaced along end plate 35 around the opening of inner cylinder 17 are axially projecting support rods 88 which slidably receive support elements 89 which are secured to the top of outer shell 86. Set screws 90 project outwardly from support element 89.

Conduit 81 is connected to a four-way valve 91 located within a valve regulating means 92. The valve 91 is also in communication with the pyrolitic gas vent 30, conduit 93 which is connected to an outside source of combustible gas (not shown), and storage conduit 94 which is connected to a pyrolytic gas storage means (not shown). The valve regulating means 92 enables conduit 81 to be in flow communication with vent 30 or conduit 93 as well as allowing vent 30 to be in flow communication with storage conduit 94.

OPERATION

Referring now to FIG. 1, a general outline of the operation of the waste pyrolysis system employing the apparatus 10 of the present invention is as follows: the collected waste is dumped or deposited in a "waste dump and storage area" from whence it is conveyed to a "grinder" wherein the waste is ground up into small particles. The waste is reduced to a uniform size consistent with the design of retort 11 such that the particles will be of such a size that they will be fully heated and processed in the time allocated through the different zones of retort 11. In route to the "grinder", any glass or metal present in the waste is removed by the "glass extractor" and a "magnetic metal extractor", respectively.

From the "grinder", the waste is transferred to a "processed waste storage and infeed" portion which is in communication with the inner chamber 21 of retort 11. The retort 11 is rotating about its inner chamber 19 which contains the flow of hot gases. The waste travels through the retort 11 counter-current to the flow of heat emanating from the "combustion chamber".

As the waste travels through the retort 11, stream is liberated from the waste and is exhausted through the "steam vent" adjacent the infeed area. The "steam vent" is in communication with a "condenser and compressor". The "condensor and compressor" condenses the steam to separate it from any pyrolytic gases which may have been liberated in this zone of the retort 11. The resultant water is discharged into any water course, and the remaining pyrolytic gases are compressed and transferred to the "combustion chamber" wherein they are burned.

As the waste travels further through the retort 11 towards the "combustion chamber" end of the apparatus 10, pyrolytic gases are liberated from the waste and are exhausted through the "pyrolytic gas vent". The vented gases can either be directed to the "combustion chamber" as fuel or directed to the "pyrolytic gas storage" area for commercial utilization.

The pyrolized waste or residue falls by gravity through a channel portion into the "residue cooling and separator" portion, adjacent the rear of the retort 11. Air is blown from the "blower" through the channel portion of the "separator" which aids in cooling the hot residue. The blown air, now hot, is directed into the "cumbustion chamber" to provide the propelling force for the hot gases through the retort 11. The residue is placed in the "residue storage" while any ash, glass or metal that was present in the organic waste material is removed from the "separator" by any suitable means, such as a truck, as depicted in FIG. 1.

Referring now to FIGS. 2–6 for the actual operation of the apparatus 10, the first step is to fire up the combustion means 14. Blower 67 is actuated so that air is blown through conduit portions 68, 78 and 71 into mixing chamber 73 and through opening 75 into chamber 19. Valve 91 is opened by valve regulating means 92 to allow conduit 93 to be in flow communication with conduit 81. Combustible gas flows through conduit 93 and from a gas supply (not shown) through conduits 81 and 76 and out nozzle 80 into chamber 19. The gas is then ignited by a spark from spark plug 80' so that the hot gases from nozzle 80 are ejected into chamber 19 with the aid of the blown air from blower 67. The air regulating means is adjusted to allow the correct amount of air to flow into chamber 19 by first loosening the set screws 90. The support elements 89 are moved along support rods 88 until a suitable air regulator entrance opening into chamber 19 between shell 86 and seal surface 87 is obtained.

Motor 62 is actuated which, through gear box 61, turns worm gear 60 which is in engagement with spur gear 59, thus axially rotating retort 11. As the retort 11 rotates, the hot gases come into contact with the baffles 20 and tend to assume a uniform, spiral path of travel through chamber 19. The baffles 20 act as a means of heat transfer for the gases from the chamber 19 to the cylinder 17. In the longer retorts, the distance from the combustion end to the heat exhaust end would usually be sufficient to effect maximum heat exchange from chamber 19 to chamber 21. However, in the smaller retorts, there are heat absorbing devices and techniques which can be utilized in addition to the baffles 20 such as vanes, bars and fluctuating cross-sectional areas in the chamber 19.

The temperature of the gases in combination with the hot blown air adjacent the rear of the retort 11 is approximately 1,500°F. The temperature decreases along inner chamber 19 until the temperature of the chamber 19 adjacent the waste infeed area at the front of the retort 11 is approximately 350°F. The heat is transmitted from cylinder 17 through the helical vanes into chamber 21.

The ground up waste is gravitationally fed from the "process waste and storage infeed" through hopper area 41 into the retort 11. The material strikes the top of cylinder 17 between forward wall 42 and vane A and falls to the bottom of tubular portions 43. The waste is advanced through the retort 11 by the combined action of the introduction of more waste into the retort 11 which pushes forward the waste already present in the chamber 21 and the continual rotation of the retort 11 which is supported at a downward incline from the infeed area to the discharge area at the rear, the angle of the slope ranging from 5° to 10°.

The helical vane also aids in urging the waste along the retort 11. The vane only acts as a screw-type conveyor through tubular portion 43, since vane sections A & B are not secured to the interior wall of portion 43, thus allowing free rotation of the vane section within the chamber defined by portion 43. Since the vane within chamber 21 is secured through retort 11 along the interior wall of cylinder 18, there is no rotation of the vane sections within chamber 21; the vane rotates along with the retort 11. The vane itself does not advance the waste through retort 11, but aids in guiding the material therethrough.

The temperature in the steam generating zone is sufficiently high (in the range of 700° F.) to drive off almost 95 percent of the moisture present in the waste. The operation of the retort 11 is such that the steam generating zone will not be entirely full of refuse. The refuse particles will gravitate to the bottom of cylinder 18 and steam will fill the upper portion thereof, escaping through steam chamber 48 and out vent 47. Steam chamber 48 provides an area wherein the steam can accumulate without particulate contamination so that it can freely flow out of chamber 21. The slope of the retort 11 provides draft assistance for the steam to gather in steam chamber 48, as well as aiding the pyrolytic gases to accumulate in pyrolytic gas chamber 34, as hereinafter described. Vent 47 could be open to the atmosphere, but in the interest of reducing odors emitted from the apparatus 10, the vent 47 is connected to the "condenser and compressor" unit which will condense the steam, transfer the condensed steam to any convenient water course, and send any resultant uncondensated pyrolytic gas to the "combustion chamber" wherein it will be volatized.

The vane sections are perforate through the steam generating zone as their purpose here is to mix, turn and elevate the waste particles over the inner cylinder 17 without hindering the movement of the steam through this zone to the steam chamber 48. The vanes can be perforated or they can have voids, gaps or chairs in them. Vane A and part of vane B which is in the tubular portion 43 are imperforate to prevent the steam from exiting the chamber 21 and entering the hopper area 41.

The vanes through the gas-tight zone are solid or imperforate so that there is a definite separation between the steam generating zone and the pyrolytic gas generating zone. Some passage of pyrolytic gas from the pyrolytic gas generating zone can be expected to pass through the gas-tight zone, but generally, the steam and pyrolytic gases exhausted from the retort 11 will not be contaminated with each other. The vane section through the gas-tight zone are close together to form a more restricted area for the waste than in the other two zones. The waste particles will accumulate in this portion, increasing their heat absorption and decreasing the gas and heat leakage out of the pyrolytic gas generating zone.

On entering the pyrolytic gas generating zone, the vanes therethrough assume the characteristic and purpose they displayed in the steam generating zone. In this zone, the refuse particles are heated sufficiently to release all of the volatile gases present therein, leaving only char and ash. As in the steam generating zone, the waste particles (the char and ash) gravitate to the bottom of the cylinder 18 and the pyrolytic gases flow to the upper portion thereof. The gases collect within the pyrolytic gas chamber 34 and exit the retort 11 through opening 25 and vent 30.

By means of valve 91 and valve regulating means 92, the exhausted pyrolytic gases can be channeled through conduit 81 and thence through conduit 76 to be used as the fuel for the combustion means 14. The excess quantity of exhausted pyrolytic gases from vent 30 can be bled through conduit 94 to a pyrolytic gas storage means.

When the char and ash reach opening 36, they fall by gravitation into bin 40. As the hot particles fall through chamber 64, they pass over the branches of conduit portion 68 through which air is being blown from blower 67. A heat exchange process occurs between the hot particles and the branches of conduit portion 68 whereby the heat from the particles is transferred to the blown air and the particles are thereby cooled. The particles fall to the bottom of bin 40 into conveyor 65 which transfers the particles to a suitable storage area 66. The storage area 66 can either be a pickup truck as shown in FIG. 1 or a collection unit wherein the particles can be stored for further commercial utilization. The now hot air within conduit portion 68 flows through conduit portion 70, neck portion 71 and out through opening 75 to aid in propelling the ignited gases from nozzle opening 80 through chamber 19.

As the apparatus 10 continues in its operation, the interior wall of cylinder 17 may start to deteriorate due to the intense heat generated by the combustion means 14. To aid in the maintenance of the retort 11, the interior wall of the cylinder 17 can be provided with a lining to which the baffles 20 are attached. Thus, when the time comes for the replacement of this lining, the old lining can be withdrawn and a new one inserted in its place. The replacement of this lining would, of course, entail the momentary stoppage of the pyrolysis operation in the apparatus 10. The flow of combustible gases through nozzle 80 is terminated, and blower 67 and motor 62 is turned off. Conduit portion 76 is then disjoined from conduit 81 by means of bolt 82. Set screws 90 are loosened so that the selectively settable air regulating means can be removed from support rods 90. The accordion-like section 72 in conduit portion 70 allows the blower means to be flexibly maneuvered as thus described. With the air regulator means removed from the opening to chamber 19, accessibility to chamber 19 is provided to remove the lining of cylinder 17 so that a new lining with a new set of attached baffles 20 can be inserted therein. With the new lining in place, the air regulator means can then be placed back in its operative position, and the operation of the apparatus 10 can be restarted.

The retort 11 is non-discriminatory in that it will be capable of accomodating all kinds, states and conditions of organic, combustible material. Notwithstanding this objective, there will be materials of a low melting point mixed with the organic material which will cause excessive accumulation of refuse at various points within the retort 11. To break down this bridging which may develop and to periodically scour the chamber 21, various size iron balls may be introduced through the infeed area into the chamber 21. These iron balls will then break up the unwanted accumulation within the chamber 21 and can be recovered from the chamber 64 in bin 40.

The speed of rotation of the retort 11 can best be expressed in relation to the velocity of rotation of outer cylinder 18. The preferred speed of rotation is in the range of 0.5 to 5 feet per second. This would mean that a retort 11 having a six foot diameter outer cylinder 18 with one-foot-per-second speed of rotation would revolve at the rate of 3.1 revolutions per minute. A retort 11 having an outer cylinder 18 with a diameter of 12 feet revolving at one-foot-per-second velocity would under go 1.3 revolutions per minute. The speed of rotation is proportional to the moisture content and the particle size of the waste material. It is calculated to take two complete revolutions of retort 11 to effect a 95 percent liberation of the moisture from the material in the steam generating zone. The moisture content can be measured by suitable automatic means within the retort 11 and the requisite speed adjustment made accordingly.

In another embodiment of the apparatus 10, the char produced as a result of the pyrolysis operation could be utilized as another source of fuel for the combustion means 14 in conjunction with the exhausted pyrolytic gases. Or the char could be separated from the uncombustible gas and sold separately as a fuel. The residual ash is sterile and in many areas, ashes, clinkers or cinders of this type are used in the construction of cinder blocks.

The pyrolytic gases generated by this pyrolysis operation have a caloric range of about 300 to 400 BTU's per cubic foot. Thus, any excess exhausted pyrolytic gases not utilized as fuel source for the retort 11 could be sold to a power company or one of the power generating units in the community.

It can be seen from the above that the method and apparatus of the present invention provides an efficient system for the pyrolysis of organic waste material. The apparatus 10 needs only a minimum amount of auxilliary equipment and, except for the inner lining of cylinder 17, eliminates the need for heat insulating means so prevelant in previous pyrolysis systems, thereby reducing operation and maintenance costs. There is also a higher degree of separation between the steam and pyrolytic gases liberated from the organic material than in previous pyrolysis units. With only the heat exhaust conduit open to the atmosphere, the amount of airbourne pollutants and odor emanating from the apparatus 10 is kept at ecologically safe levels.

The design of retort 11 provides a uniform heating and pyrolysis of the organic material. Since the material rotates around the heat, there is a more efficient heat transfer to the material than in prior pyrolysis systems. All of the heat is utilized to pyrolize the material with none of the radiant energy being lost.

It is obvious that one skilled in the art may make modifications in the details of construction without departing from the spirit of the invention which is set out in varying scope in the appended claims.

What is claimed is:

1. An apparatus for the pyrolysis of solid wastes comprising:
   a. a retort having first and second ends and including a pair of spaced coaxially disposed hollow cylindrical members, one member being located within the other,
   b. an inlet for waste adjacent said first end communicating with the space between said members,
   c. means for rotating the retort about the axis of said cylindrical members,
   d. an outlet for pyrolytic residue adjacent said second end communicating with the space between said members,
   e. heating means adjacent said second end communicating with the interior of said inner member,
   f. means located in the space between said members intermediate the ends thereof for providing a zone which is substantially more difficulty penetrable by gas than the end portions of said space, thus providing a waste drying zone at the inlet side of said last-mentioned means and a pyrolytic gas generating zone at the outlet side thereof,
   g. a first fluid exhaust means communicating with said waste drying zone,
   h. a second fluid exhaust means communicating with said gas generating zone, and
   i. a helical vane surrounding said inner member and extending substantially from one end to the other of the space between said inner and outer members, wherein the portion of said vane located in said difficulty pentrable zone is imperforate while the portions located on opposite sides of said zone are provided with perforations.

2. An apparatus as in claim 1 wherein the means for providing said difficultly penetrable zone comprises a helical vane surrounding said inner member.

3. Apparatus as in claim 1 wherein the convolutions of the imperforate portion of said vane are located closer together than the remaining convolutions thereof.

4. Apparatus as in claim 1 wherein there is provided adjacent said first end a fixed cylinder coaxial with said inner and outer members and extending into the space between them with a portion of said helical vane being substantially in contact with the inner wall of said cylinder, and wherein said waste is fed to an end of said cylinder and propelled through the cylinder by said vane.

5. Apparatus as in claim 1 wherein said heating means comprises a fluid burner directed into said second end of said inner member.

6. Apparatus as in claim 5 wherein there is provided a residue collection means adjacent said second end through which an air conduit passes and wherein air is passed through said conduit to the burner.

7. An apparatus for the pyrolysis of solid wastes comprising:
   a. a retort having first and second ends and including a pair of spaced coaxially disposed hollow cylindrical members, one member being located within the other,
   b. an inlet for waste adjacent said first end communicating with the space between said members,
   c. means for rotating the retort about the axis of said cylindrical members,
   d. an outlet for pyrolytic residue adjacent said second end communicating with the space between said members,
   e. heating means adjacent said second end communicating with the interior of said inner member,
   f. means located in the space between said members intermediate the ends thereof for providing a zone which is substantially more difficulty penetrable by gas than the end portions of said space, thus providing a waste drying zone at the inlet side of said last-mentioned means and a pyrolytic gas generating zone at the outlet side thereof,
   g. a first fluid exhaust means communicating with said waste drying zone,
   h. a second fluid exhaust means communicating with said gas generating zone,
   i. a helical vane surrounding said inner member and extending substantially from one end of the other of the space between said inner and outer members, and
   j. a cylinder located in said difficulty penetrated zone and being spaced from the inner wall of said outer member and surrounding said helical vane, said cylinder being connected at one of its ends to the inner wall of said outer member by an annular flange thus forming between said cylinder and outer member an annular chamber opening at one end into the space between said inner and outer members, and wherein said second fluid exhaust means communicate with said annular space.

8. Apparatus as in claim 7 wherein the portion of said vane within said cylinder is imperforate and in sealing relation with said cylinder.

9. Apparatus as in claim 8 wherein the convolutions of said imperforate portion of said vane are more closely spaced than those of the remaining portions.

* * * * *